United States Patent Office 3,169,425
Patented Feb. 16, 1965

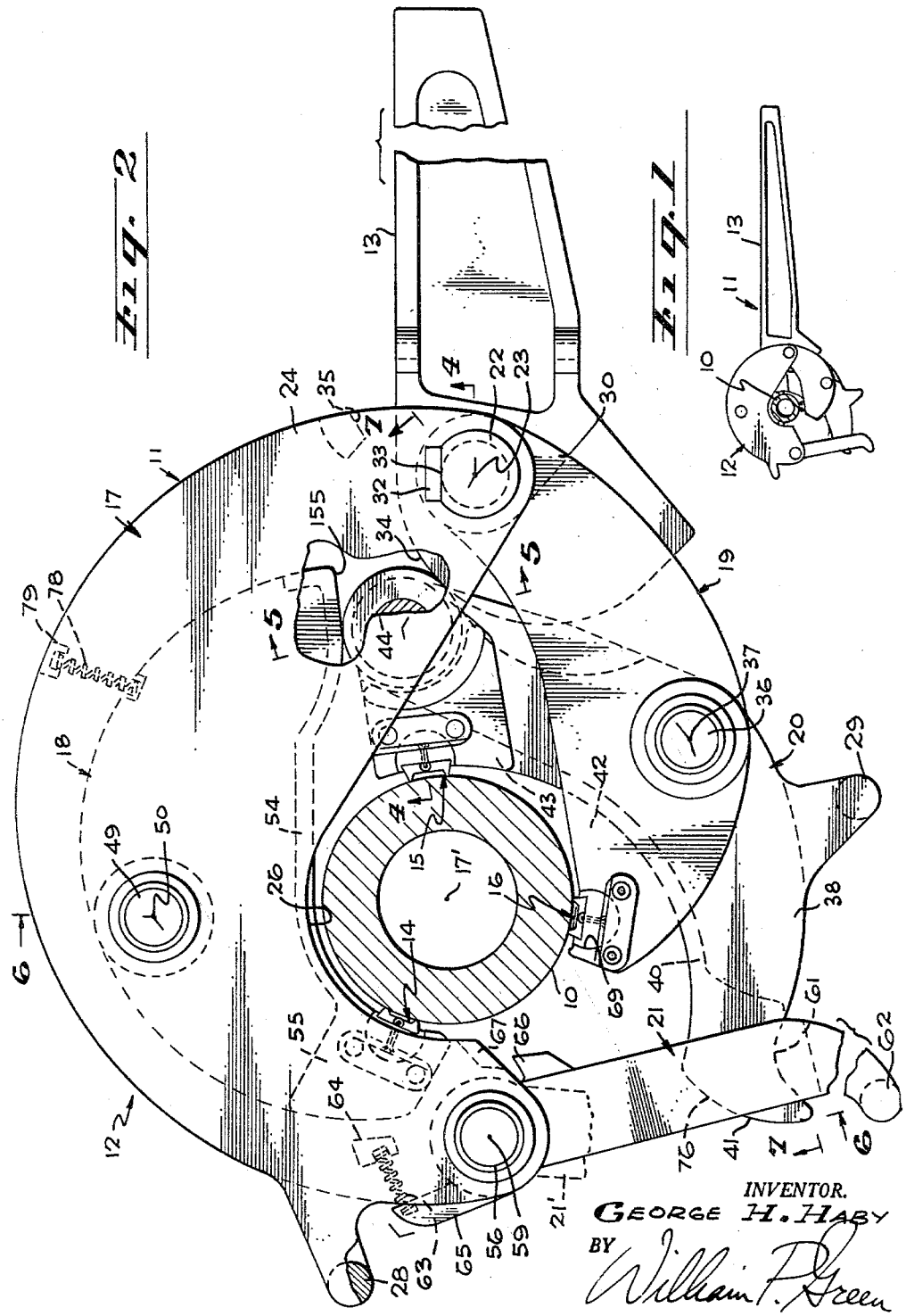

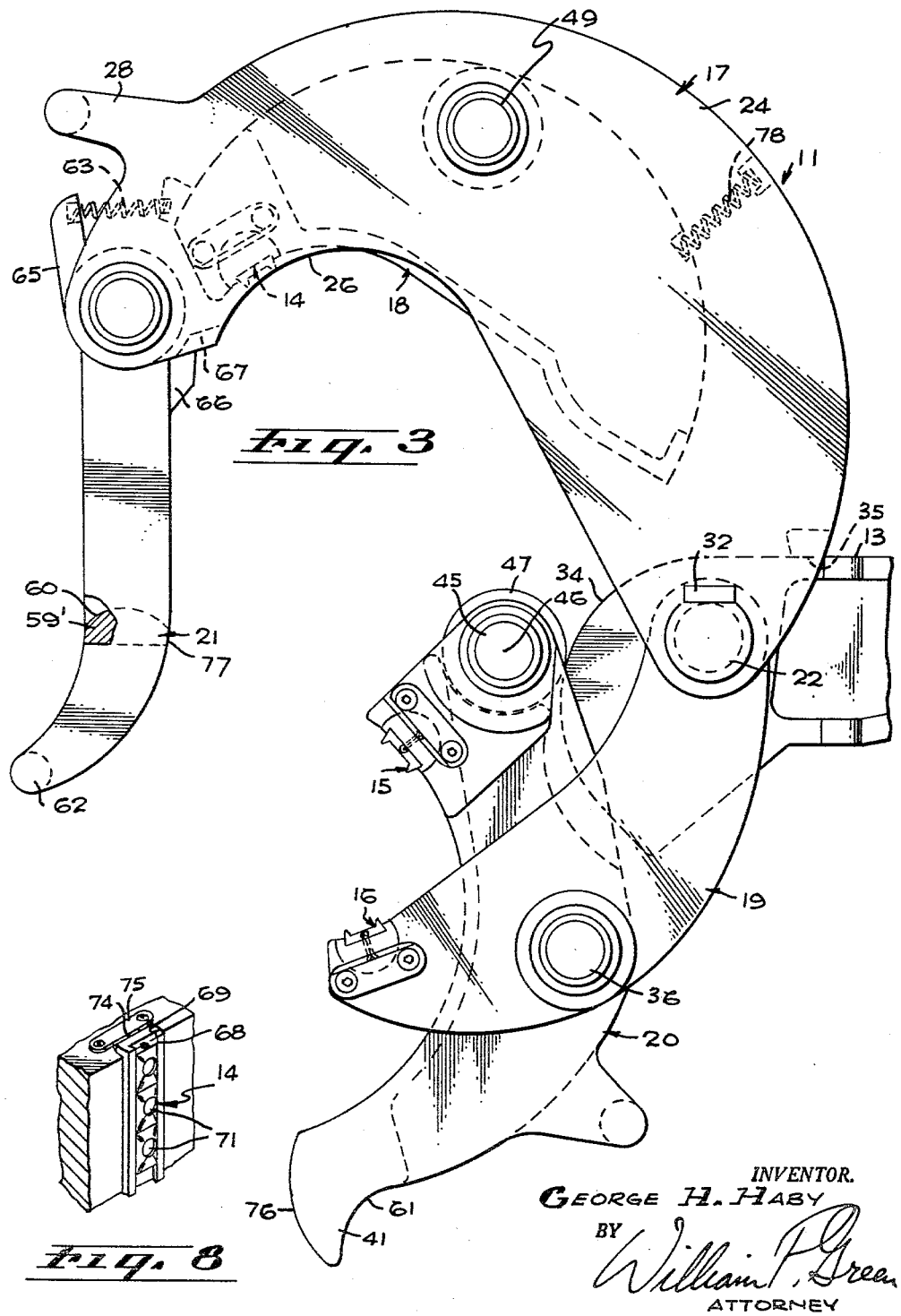

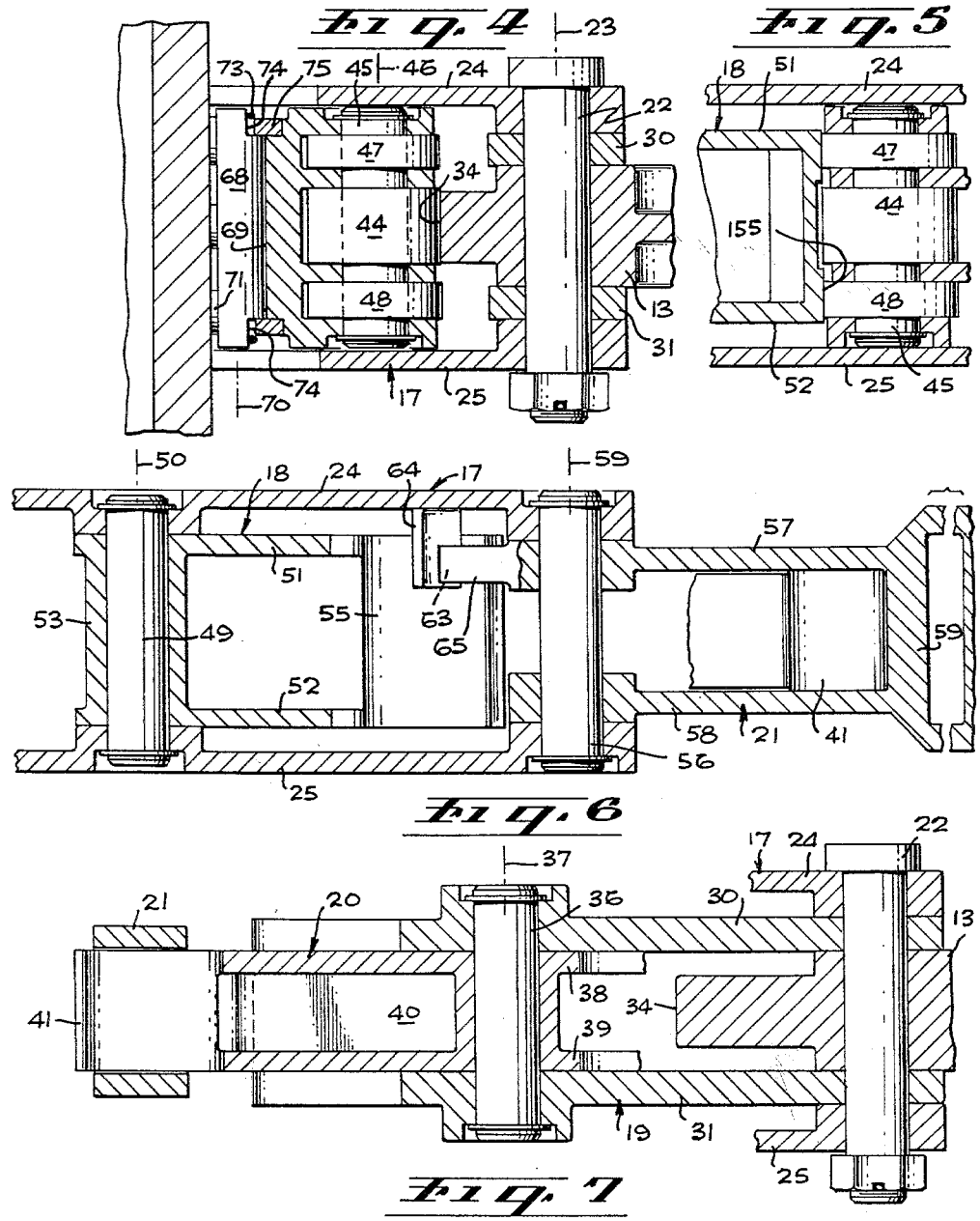

3,169,425
VARIABLE SIZE PIPE TONGS
George H. Haby, Altadena, Calif., assignor to Abegg &
Reinhold Co., Los Angeles, Calif., a corporation of
California
Filed Aug. 20, 1962, Ser. No. 217,901
9 Claims. (Cl. 81—91)

This invention relates to an improved type of pipe gripping tong structure, for use in gripping and turning a well pipe or the like.

In well drilling operations, various different sizes of well pipe are used under different operating conditions, and at different times in drilling the same well; and it is therefore necessary to have available tongs capable of gripping and turning pipes of all these different sizes. Conventional tongs are so designed, however, as to effectively grip only a very limited range of pipe sizes without effecting some type of very substantial structural alteration of the tong device. Usually, this alteration is effected by substituting different parts in the tong structure, or making a mechanical adjustment, in a manner varying the effective diameter of the tong.

A general object of the present invention is to provide an improved tong device which is capable without any such alteration of gripping any of several different pipe sizes within a rather wide size range, say for example an extended range between pipes of 4½ inches diameter and 7½ inches diameter. Thus, a single tong may handle substantially all of the most common pipe sizes which are encountered. Further, a device embodying the invention is so constructed that, regardless of which of the numerous sizes of pipe may be handled, the gripping action is in every respect positive and completely effective for securely holding the pipe against any movement relative to the tong device. In addition, the tong is easily actuable between gripping and released conditions, and is shiftable automatically to a proper dimension for gripping whatever size pipe may be encountered, merely by placing the tong about the pipe and then actuating the handle of the device in a direction to first tighten the gripping parts of the tong against the pipe and then turn the pipe by means of the tong.

Structurally, a tong embodying the invention desirably includes a structure adapted to extend partially and preferably entirely about the pipe, and including at least one and preferably several gripping elements which are moveable generally radially toward and away from the pipe to vary the effective diameter of the tong and to grip the pipe. In addition to these parts, the device includes an actuating handle which is connected to the defined pipe encircling structure for predetermined relative shifting movement, together with camming mechanism which is automatically actuable in response to such shifting movement of the handle to actuate one and desirably all of the gripping elements toward and away from the pipe. Thus, the camming mechanism attains automatic adjustment of the diameter of the tong, and also causes the gripping elements in their adjusted settings to tightly grip the pipe. The manner in which this camming mechanism operates will be discussed in detail at a latter point.

The above and other features and objects of the present invention will be better understood from the following detailed description of the typical embodiment illustrated in the accompanying drawings in which FIG. 1 is a plan view showing a tong device embodying the invention in its condition of use about a well drilling pipe. FIG. 2 is a greatly enlarged view similar to FIG. 1, but illustrating in greater detail the manner in which the various parts of the tong coact. FIG. 3 is a view similar to FIG. 2, but showing the tong in its open condition. FIGS. 4, 5, 6 and 7 are vertical sections taken essentially on lines 44, 55, 66 and 77 respectively of FIG. 2. FIG. 8 is a perspective view representing the manner in which the gripping units are shiftably mounted and the parts by which they are carried.

In FIGS. 1 and 2, there is represented at 10 a vertically extending drill pipe, together with a tong device 11 for gripping and turning the pipe, or holding the pipe stationary while another connected stand of pipe is turned. The tong 11 may be considered as including a multiple section structure 12 extending about the pipe, and connected to a handle 13 for actuating the device. The structure 12 includes three evenly circularly spaced gripping units 14, 15 and 16, which engage the pipe at three different sides, and which are actuable generally radially toward and away from the central vertical axis 17' of the pipe and tong, by limited swinging movement of handle 13 relative to structure 12.

To now describe in greater detail the different sections from which the pipe encircling structure 12 is formed, these sections include a carrier part 17 received at a first side of the pipe, three jaws 18, 19 and 20, and a latch member 21 for retaining the pipe encircling structure in its closed condition of FIGS. 1 and 2. Handle 13 is attached to the rest of the mechanism by means of a pivot pin or bolt 22 (see FIGS. 2, 4 and 7), which secures handle 13, carrier part 17, and jaw 19 together for pivotal movement relative to each other about an axis 23 disposed parallel to main axis 17' of the tong. As seen clearly in FIGS. 4 and 7, carrier part 17 may include two essentially identical top and bottom walls 24 and 25, having arcuately curved inner edges 26 centered about axis 17' and adapted to be received in parallel spaced relation to the outer surface of pipe 10. The top and bottom walls 24 and 25 of carrier part 17 may be rigidly secured together in any suitable manner, as by forming a loop type outwardly projecting handle 28 between walls 24 and 25, for use in association with a similar loop type handle 29 formed on jaw 20 in manipulating the tong.

Referring again to FIGS. 4 and 7, the upper and lower walls 24 and 25 of carrier part 17 are pivoted to upper and lower portions of the pivot pin 22, with two similar upper and lower walls 30 and 31 of jaw 19 being received directly beneath wall 24 and directly above wall 25 respectively, and with the mounting portion of handle 13 being received between walls 30 and 31. The pivot pin may be retained against rotation relative to carrier part 17 by a locking key 32 secured to the carrier part and engaging a flat surface 33 on the head of the pivot pin. Handle 13 is provided with a cam surface 34 which progressively increases in radius with respect to axis 23 as surface 34 advances in a counter clockwise direction about that axis (as viewed in FIG. 2). Counter clockwise swinging movement of handle 13 about pin 22 is limited by engagement of the handle with a stop lug or shoulder 35 carried by part 17 between its upper and lower walls 24 and 25.

Jaw 19 is pivotally connected to jaw 20 by means of a pin 36 (FIG. 7) for relative pivotal movement about an axis 37 extending parallel to axes 17 and 23. The upper and lower walls 30 and 31 of jaw 19 are received above and beneath jaw 20, which itself may include two upper and lower walls 38 and 39 (FIG. 7) interconnected by a vertical wall or web 40. The extremity of jaw 20 forms a hook 41 which is engageable with latch element 21 to retain the tong in closed condition. Top and bottom walls 30 and 31 of jaw 19 are rigidly interconnected by a vertically extending integral structure 42 (FIG. 2) which is so located as to be offset from and avoid interference with the jaw 20. Similarly, vertical web or wall 40 of jaw 20 has a thickened portion 43 at one of its ends for carrying gripping unit 15.

The end of jaw 20 which carries gripping unit 15 is actuated radially toward and away from axis 17' by engagement of cam surface 34 on handle 13 with a roller 44 (FIG. 4) which is mounted rotatably to jaw 20 by a pin 45. The rotary axis 46 of roller 44 is disposed parallel to the previously mentioned axes 17', 23 and 37. Pin 45 also mounts two upper and lower rollers 47 and 48 for rotation about the same axis 46 relative to jaw 20, with the three rollers 44, 47 and 48 typically being of the same external diameter.

Jaw 18 is received vertically between top and bottom walls 24 and 25 of carrier part 17 (FIG. 6), and is mounted by a pivot pin 49 for pivotal movement relative to carrier part 17 about an axis 50 disposed parallel to axis 17' and the other discussed axes. Jaw 18 may consist of two upper and lower parallel walls 51 and 52 rigidly integrated by a vertical tubular portion 53 and an inner wall 54 having a widened portion 55 to which gripping unit 14 is mounted. The inner wall 54 follows the contour represented in FIG. 2, and has a portion forming a camming surface 155 engageable by rollers 47 and 48 in the manner illustrated in FIG. 5 to pivotally actuate jaw 18 in response to movement of the rollers. Such pivotal movement of jaw 18 is resisted yieldingly by a spring 78, bearing at opposite ends against the jaw and a lug 79 formed on carrier part 17.

Latch element 21 is pivotally connected to the extremity of carrier part 17 by means of a pivot pin 56 (FIGS. 2, 3 and 6), which extends through walls 24 and 25 of part 17, and through two upper and lower walls 57 and 58 of latch member 21. Pivotal axis 59 of pin 56 extends parallel to axis 17 and the other previously discussed axes. The two walls 57 and 58 of latch member 21 are integrally joined together near their outer ends by a short vertical cross piece 59' (FIGS. 2, 3 and 6) having a curved surface 60 adapted to nest in the recess 61 formed in the terminal hook portion 41 of jaw 20, in a relation releasably latching the tong parts in the closed gripping positions of FIG. 2. For facilitating actuation of latch element 21, this element may have a handle loop 62 formed at its free end, beyond cross piece 59'.

Element 21 is yieldingly actuated in a counter clockwise direction, as viewed in FIG. 2, and to its latched position, by a spring 63, bearing at opposite ends against a backing element 64 carried by carrier part 17, and a lug 65 secured to element 21. Movement in this direction is limited in the FIG. 3 condition of the apparatus by engagement of a lug 66 on part 21 with a stop element 67 on the carrier part.

The three gripping units 14, 15 and 16 may be essentially identical, and similarly mounted to portions 42, 43 and 55 respectively of the three jaws. As will be apparent from FIGS. 2, 3, 4 and 8, each of the gripping units includes an axially elongated partial cylindrical body 68 which is nested within a correspondingly shaped partial cylindrical recess 69 formed in portion 42, 43 or 55 of one of the jaws, to mount body 68 for limited rotary or pivotal shifting movement about an axis 70 extending parallel to main axis 17. At its inner side, each body 69 carries one or a series of gripping elements 71, which may be received within an under cut axially extending groove 72 in the inner side of body 68, with elements 71 typically being retained in the groove by cotter pins at the upper and lower ends of body 68. The rotary movement of each body 68 and its carried elements 71 is limited by engagement of a pair of flats or shoulders 74 on body 68 with two upper and lower stop elements 75, which elements serve also to retain body 68 against axial withdrawal from cylindrical recess 69. Thus, the discussed pivotal type mounting of the gripping units 14, 15 and 16 allows these gripping units to shift automatically to proper positions for effectively engaging and gripping, and directly facing, the outer surface of pipe 10.

To now describe the manner in which the tong is actually used, assume first of all that the tong is in the open condition of FIG. 3, with latch element 21 detached from jaw 20, to provide an open throat between these parts through which a pipe may enter the tong. With the tong in this condition, it is moved laterally toward the well pipe 10 in a manner causing the pipe to enter the open throat between parts 20 and 21. Upon such entrance, the pipe may first of all engage the gripping unit 15 carried by jaw 20, so that upon further relative movement of the tong and pipe, this engagement of the pipe with gripping unit 15 will cause jaws 19 and 20 to swing about the pivotal axis 23 of pin 22 relative to handle 13 and carrier part 17. This swinging movement of jaws 19 and 20 causes hook portion 41 of jaw 20 to move progressively toward latch element 21, ultimately to a position in which cam surface 76 on hook element 41 engages the corner portion 77 of cross piece 59' of latching element 21, to swing the latch element about its pivot pin 56 and in a clockwise direction as viewed in FIG. 2, to a position such as that designated in broken lines at 21' in FIG. 2. Thus, the latch element is actuated against the tenancy of spring 63 to a position allowing hook 41 to pass cross piece 59, following which the latch element is urged by spring 63 into the FIG. 2 position of latched engagement with recess 61 of the hook element. In this way, the latch automatically closes in response to movement of a pipe into the tong device.

After the latch has thus been closed, an operator grasps handle 13, and turns it about main axis 17 in the clockwise direction indicated in FIG. 1. This causes handle 13 to pivot about axis 23 relative to carrier part 17, and upon such pivotal movement cam surface 34 of the handle causes roller 44 (FIG. 4) to be cammed radially inwardly about axis 37 of pivot pin 36, and toward main axis 17' of the tong. This brings gripping unit 15 into tight gripping engagement with pipe 10. At the same time, the inward swinging movement of the end of jaw 20 which carries roller 44 acts, by virtue of the engagement of the opposite end of that jaw with latch element 21, to swing pivot pin 36 inwardly toward axis 17', and to thereby swing the free end of jaw 19, and the carried gripping unit 16, inwardly toward axis 17', and about pivotal axis 23.

The cam surface 155 formed on the third jaw 18 is so shaped as to cause pivotal movement of jaw 18 about axis 50, relative to carrier part 17, in response to the discussed inward movement of rollers 44, 47 and 48 toward axis 17, and in a direction causing the third gripping unit 14 to also move radially inwardly toward axis 17'. Thus, as lever 13 is turned about axis 23 relative to carrier part 17, the camming action of surface 34, rollers 44, 47 and 48, and cam surface 155, serves to bring all three of the gripping units 14, 15 and 16 inwardly toward axis 17, at essentially the same rate, until all of these units engage and tightly grip the pipe. Further movement of the lever about axis 17' will then act to bodily turn the pipe. The range of cam actuated radial adjusting movement of gripping units 14, 15 and 16 is great enough to allow use of the tong on any size of pipe within a very wide diameter range. Also, the pivotal shiftability of the individual gripping units 14, 15 and 16 about their separate axes 70 assures proper engagement of the gripping elements with the pipe regardless of its size.

When it is desired to detach the tong from a pipe, the operator merely pulls latch element 21 to its broken line position of FIG. 2, by engagement of handle lug 62, so that jaws 19 and 20 are free to swing outwardly to their open positions of FIG. 1.

I claim:

1. A pipe tong comprising first and second jaw members adapted to extend partially about a pipe to be gripped, additional linkage connected to said jaw members and forming with said members essentially a loop adapted to completely encircle said pipe, a pivotal joint connecting said jaw members together at a predetermined location for relative pivotal movement, each of said jaw members having first and second end portions extending in different directions from said pivotal joint, first and second pipe gripping means carried by said first end portions respectively of said jaw members, said first end portion of one of said jaw members extending generally in a first circular direction about said pipe and said first end portion of the other jaw member extending generally in the opposite circular direction, said second end portion of one jaw member extending generally in one circular direction and said second end portion of the other jaw member extending in generally the other circular direction, means for connecting opposite ends of said additional linkage to said second end portions of said two jaws respectively, and means for actuating said jaw members pivotally relative to one another to grip a pipe, said additional linkage including a carrier part connected at opposite ends to said second end portions respectively of said first and second jaw members, and a third jaw member pivotally mounted to said carrier part and carrying third gripping means for contacting and gripping a pipe.

2. A pipe tong comprising first and second jaw members adapted to extend partially about a pipe to be gripped, additional linkage connected to said jaw members and forming with said members essentially a loop adapted to completely encircle said pipe, a pivotal joint connecting said jaw members together at a predetermined location for relative pivotal movement, each of said jaw members having first and second end portions extending in different directions from said pivotal joint, first and second pipe gripping means carried by said first end portions respectively of said jaw members, said first end portion of one of said jaw members extending generally in a first circular direction about said pipe and said first end portion of the other jaw member extending generally in the opposite circular direction, said second end portion of one jaw member extending generally in one circular direction and said second end portion of the other jaw member extending in generally the other circular direction, means for connecting opposite ends of said additional linkage to said second end portions of said two jaws respectively, said additional linkage including a carrier part connectible at opposite ends to said second end portions respectively of said first and second jaw members, and a third jaw member pivotally mounted to said carrier part intermediate said ends thereof and carrying third gripping means for contacting and gripping a pipe, said tong including means for actuating said first and second jaw members pivotally relative to one another and for actuating said third jaw member relative to said carrier part.

3. A pipe tong comprising first and second jaw members adapted to extend partially about a pipe to be gripped, additional linkage connected to said jaw members and forming with said members essentially a loop adapted to completely encircle said pipe, a pivotal joint connecting said jaw members together at a predetermined location for relative pivotal movement, each of said jaw members having first and second end portions extending in different directions from said pivotal joint, first and second pipe gripping means carried by said first end portions respectively of said jaw members, said first end portion of one of said jaw members extending generally in a first circular direction about said pipe and said first end portion of the other jaw member extending generally in the opposite circular direction, said second end portion of one jaw member extending generally in one circular direction and said second end portion of the other jaw member extending in generally the other circular direction, means for connecting opposite ends of said additional linkage to said second end portions of said two jaws respectively, said additional linkage including a carrier part connectible at opposite ends to said second end portions respectively of said first and second jaw members, and a third jaw member pivotally mounted to said carrier part intermediate said ends thereof and carrying third gripping means for contacting and gripping a pipe, said tong including a handle pivoted for swinging movement relative to one of said first and second jaw members and relative to said carrier part, cam means on said handle acting to relatively pivotally actuate said first and second jaw members and to pivot said third jaw member relative to said carrier part upon swinging movement of said handle.

4. A pipe tong comprising first and second jaw members adapted to extend partially about a pipe to be gripped, additional linkage connected to said jaw members and forming with said members essentially a loop adapted to completely encircle said pipe, a pivotal joint connecting said jaw members together at a predetermined location for relative pivotal movement, each of said jaw members having first and second end portions extending in different directions from said pivotal joint, first and second pipe gripping means carried by said first end portions respectively of said jaw members, said first end portion of one of said jaw members extending generally in a first circular direction about said pipe and said first end portion of the other jaw member extending generally in the opposite circular direction, said second end portion of one jaw member extending generally in one circular direction and said second end portion of the other jaw member extending in generally the other circular direction, means for connecting opposite ends of said additional linkage to said second end portions of said two jaws respectively, said additional linkage including a carrier part connectible at opposite ends to said second end portions respectively of said first and second jaw members, and a third jaw member pivotally mounted to said carrier part intermediate said ends thereof and carrying third gripping means for contacting and gripping a pipe, said tong including a handle pivoted for swinging movement relative to one of said first and second jaw members and relative to said carrier part, a cam follower roller carried by the other of said first and second jaw members, a cam surface on said handle operable to engage said roller and thereby relatively pivotally actuate said first and second jaw members to grip a pipe upon swinging movement of the handle, and a surface on said third jaw engageable by said roller to pivot said third jaw relative to said carrier part upon said handle movement.

5. A pipe tong comprising first and second jaw members adapted to extend partially about a pipe to be gripped, additional linkage connected to said jaw members and forming with said members essentially a loop adapted to completely encircle said pipe, a pivotal joint connecting said jaw members together at a predetermined location for relative pivotal movements, each of said jaw members having first and second end portions extending in different directions from said pivotal joint, first and second pipe gripping means carried by said first end portions respectively of said jaw members, said first end portion of one of said jaw members extending generally in a first circular direction about said pipe and said first end portion of the other jaw member extending generally in the opposite circular direction, said second end portion of one jaw member extending generally in one circular direction and said second end portion of the other jaw member extending in generally the other circular direction, means for connecting opposite ends of said additional linkage to said second end portions of said two jaws respectively, said additional linkage including a carrier part pivotally connected at one end to said second end of said first jaw member, a gate pivotally connected to the other end of said carrier part and detachably connectible to said second end portion of said second jaw member, and a third jaw member pivotally connected to said carrier part and having third gripping means engageable with the pipe, said tong including a handle pivoted for swinging movement relative to said first jaw member and relative to said carrier part, and cam means on said handle acting against said second jaw member to relatively pivotally actuate said first and second jaw members and to pivot said third jaw member relative to said carrier part upon swinging movement of said handle.

6. A pipe tong comprising first and second jaw members adapted to extend partially about a pipe to be gripped, additional linkage connected to said jaw members and forming with said members essentially a loop adapted to completely encircle said pipe, a pivotal joint connecting said jaw members together at a predetermined location for relative pivotal movement, each of said jaw members having first and second end portions extending in different directions from said pivotal joint, first and second pipe gripping means carried by said first end portions respectively of said jaw members, said first end portion of one of said jaw members extending generally in a first circular direction about said pipe and said first end portion of the other jaw member extending generally in the opposite circular direction, said second end portion of one jaw member extending generally in one circular direction and said second end portion of the other jaw member extending in generally the other circular direction, means for connecting opposite ends of said additional linkage to said second end portions of said two jaws respectively, said additional linkage including a carrier part pivotally connected at one end and at a predetermined axis to said second end of said first jaw member, a gate pivotally connected to the other end of said carrier part and detachably connectible to said second end portion of said second jaw member, and a third jaw member pivotally connected to said carrier part and having third gripping means engageable with the pipe, said tong including a handle pivoted for swinging movement about said predetermined axis relative to said first jaw member and relative to said carrier part, a cam follower roller carried by said first end portion of said second jaw member, a cam surface on said handle operable to engage said roller and thereby relatively pivot said first and second jaw members to grip a pipe upon swinging movement of the handle, and a surface on said third jaw engageable by said roller to pivot said third jaw member relative to said carrier part in a direction to grip said pipe upon said handle movement.

7. A pipe tong as recited in claim 6, in which each of said gripping means includes a gripping unit mounted for limited pivotal movement relative to the carrying jaw member to automatically adjust for engagement with different sizes of pipe.

8. A pipe tong as recited in claim 6, including a spring yieldingly urging said third jaw member in a retracting direction relative to said carrier part.

9. A pipe tong as recited in claim 1, including a spring yieldingly urging said third jaw member in a retracting direction relative to said carrier part.

References Cited by the Examiner
UNITED STATES PATENTS

| | | | |
|---|---|---|---|
| 883,630 | 3/08 | Dunn | 81—91 X |
| 1,072,320 | 9/13 | Dunham | 81—67 |
| 1,099,427 | 6/14 | Christopherson | 81—91 |
| 1,175,400 | 3/16 | Allison | 81—91 |
| 1,541,224 | 6/25 | Kaough | 81—91 |
| 1,554,677 | 9/25 | Johnson et al. | 81—91 |
| 1,556,220 | 10/25 | Hill | 81—66 X |
| 1,629,631 | 5/27 | Nix | 81—66 |
| 1,660,853 | 2/28 | Wilson. | |
| 1,906,696 | 5/33 | Lynch. | |
| 1,921,281 | 8/33 | Carlson. | |
| 2,347,698 | 5/44 | Lundeen | 81—66 |
| 2,591,887 | 4/52 | Spiri. | |
| 2,792,735 | 5/57 | Ice | 81—53 X |
| 2,989,800 | 6/61 | Hesser et al. | 81—91 X |

WILLIAM FELDMAN, *Primary Examiner.*